(12) United States Patent
Au

(10) Patent No.: US 6,224,073 B1
(45) Date of Patent: May 1, 2001

(54) WIND SCREEN ASSEMBLY FOR A BABY STROLLER

(76) Inventor: King Tong Au, 7/F 105 C Broadway St., Mei foo, Kowloon (HK)

( * ) Notice: Subject to any disclaimer, the term of this patent is extended or adjusted under 35 U.S.C. 154(b) by 0 days.

(21) Appl. No.: 09/164,270

(22) Filed: Oct. 1, 1998

(51) Int. Cl.$^7$ ...................................................... B62B 9/14
(52) U.S. Cl. ...................... 280/47.38; 280/650; 296/77.1
(58) Field of Search ................. 280/47.38, 642, 280/647, 650, 658; 296/77.1, 81, 83; 5/416; 135/88.02, 93, 135; 150/166; 160/354, 377

(56) References Cited

U.S. PATENT DOCUMENTS

| | | | |
|---|---|---|---|
| 1,770,841 | * | 7/1930 | Clyman ................................... 296/81 |
| 3,834,756 | * | 9/1974 | Grell .................................... 296/77.1 |
| 3,960,161 | * | 6/1976 | Norman ................................. 135/93 |
| 4,098,536 | * | 7/1978 | Mills .................................... 296/77.1 |
| 4,570,956 | * | 2/1986 | Dyer ................................. 280/47.38 |
| 5,074,616 | * | 12/1991 | Smith ........................................ 5/416 |
| 5,363,871 | * | 11/1994 | Garrand et al. ........................... 5/416 |
| 5,398,951 | * | 3/1995 | Ryu .................................... 280/47.38 |
| 5,460,395 | * | 10/1995 | Chen ................................... 280/47.38 |
| 5,542,732 | * | 8/1996 | Pollman .............................. 296/77.1 |
| 5,788,317 | * | 8/1998 | Nation ................................. 150/166 |
| 5,927,793 | * | 7/1999 | McGrath, Jr. ........................ 150/166 |
| 6,012,756 | * | 1/2000 | Clark-Dickson .................... 296/77.1 |

FOREIGN PATENT DOCUMENTS

| | | | |
|---|---|---|---|
| 278818 | * | 2/1952 | (CH) ................................. 280/47.38 |
| 2200327 | * | 8/1988 | (GB) ................................. 280/47.38 |

* cited by examiner

*Primary Examiner*—Frank Vanaman
(74) *Attorney, Agent, or Firm*—Browning Bushman P.C.

(57) ABSTRACT

A collapsible wind screen assembly for an infant stroller or similar perambulator. The collapsible wind screen assembly includes two collapsible side panel members comprising loops made of resilient material, such as steel or the like, which act as frames for the wind screen with nylon or mosquito netting material as a covering. Each side panel member is placed on either side of tie stroller and secured to the stroller with fasteners such as adhesive tape or laces A cover member comprising flexible mesh or netting material covers the front and top of the assembly.

17 Claims, 2 Drawing Sheets

FIG. 3
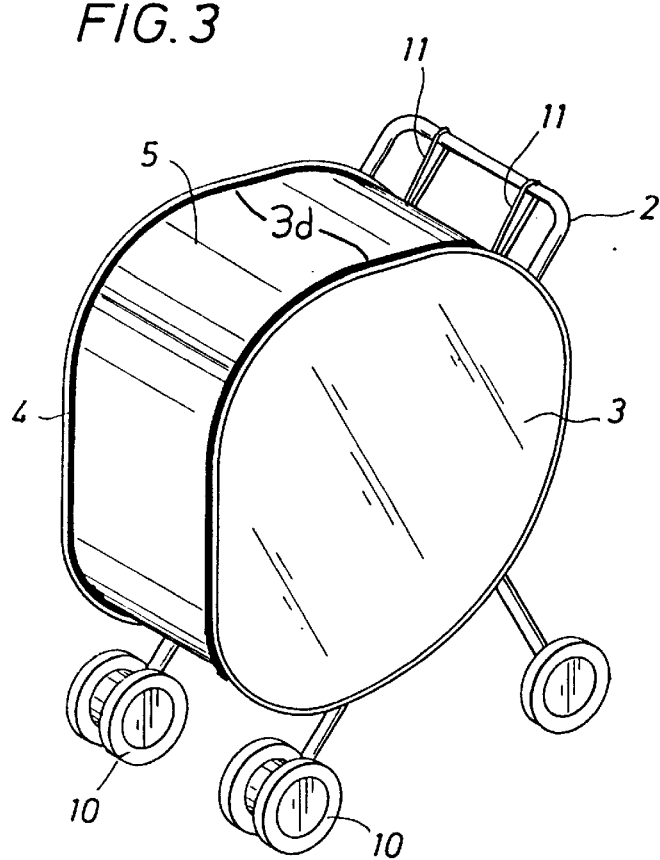
FIG. 4
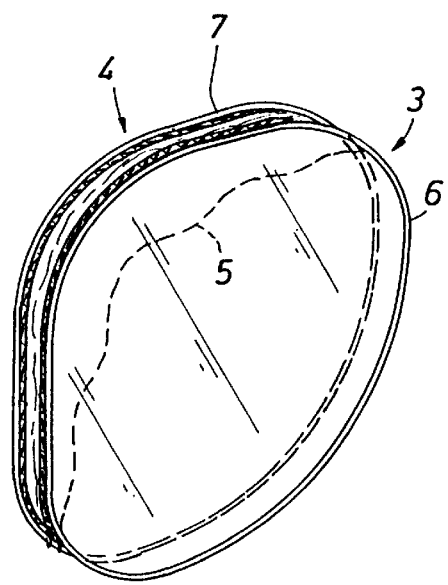
FIG. 5
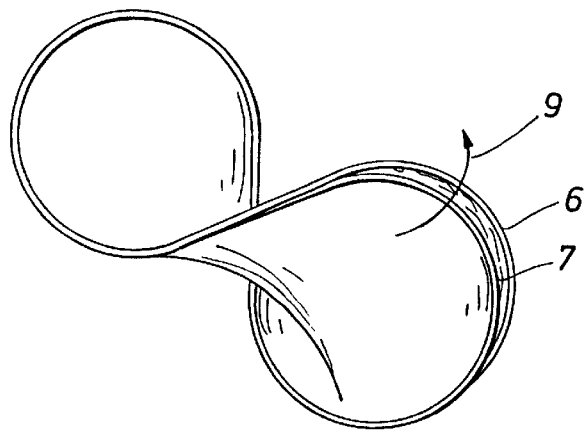
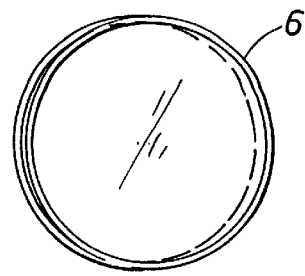
FIG. 6

WIND SCREEN ASSEMBLY FOR A BABY STROLLER

BACKGROUND OF THE INVENTION

1. Field of the Invention

The present invention relates to a wince screen assembly adapted to be removably secured to a baby stroller or the like, providing the user with a quick, easy and light weight means for protecting a child within the stroller while providing easy access to the child within and quick removal and collapsibility for storage of assembly when not in use.

2. Description of the Prior Art

Various wind screens and covers for baby strollers have been provided in the past. Many of these are complex structures which result in high cost and weight and/or lace features which allow fast assembly and disassembly or lack a frame structure needed to provide shape and stability in the wind.

In U.S. Pat. No. 1,339,527 issued to Sperling, a collapsible screen for baby carriages is disclosed which includes a ruffle attached to the perimeter of the screen containing a concealed coil spring which is used for providing shape to the screen. An embodiment adapted for stroller is not disclosed. U.S. Pat. No. 1,770,841 issued to Clyman, discloses a cover for a baby carriage which includes mesh top, side and end pieces and stitched edges reinforced with piping in the form of tape. The ability to be collapsed for storage is not disclosed. U.S. Pat. No. 4,582,355 issued to Hall, discloses a retractable weather guard for a child stroller or baby carriage which includes a sheet of impervious flexible clear plastic material and a top canopy but does not include a frame needed for providing shape and stability in the wind. U.S. Pat. No. 5,514,865, discloses an insect netting assembly for a baby stroller. In the embodiment shown in FIGS. 1 and 2, an assembly in the shape of an arched enclosure which includes a pair of spring rods is shown. The assembly is collapsible but requires disassembly of the structure.

SUMMARY OF THE INVENTION

It is a feature of the present invention to provide a collapsible wind screen assembly for a baby stroller or similar carriage vehicle flat substantially overcomes all of the disadvantages of the above-mentioned prior art.

The collapsible wind screen assembly of the present invention includes two collapsible side panel members comprising loops of resilient steel material or the like, placed on either side of the stroller which act as frames for the assembly with each provided with a covering of flexible sheet or web material, such as nylon fabric or mosquito netting material. The side panel members are secured to the stroller with fasteners such as adhesive tape, snaps, or laces. A cover member comprising a flexible web mesh or netting material covers the front and top of the assembly. The edges of the cover member may be permanently attached to corresponding top and front edges of the loop members or removably attached by mating zipper and velcro members.

An object of the present invention is to provide a wind screen assembly for a stroller which is light weight, simple to manufacture, low cost and can be easily and quickly placed onto or removed from the stroller and can be easily and quickly collapsed for storage.

BRIEF DESCRIPTION OF THE DRAWINGS

For a fuller understanding of the nature of the present invention, references should be had to the following detailed description taken in connection with the accompanying drawings, in which:

FIG. 3 is a perspective view illustrating a third alternative embodiment of the wind screen assembly.

FIG. 4 shows the side panels of the wind screen assembly being placed adjacent to each other after detaching the assembly from the stroller. This is the first step in collapsing the stroller.

FIG. 5 is a perspective view of the assembly being twisted into a figure 8 pattern.

FIG. 6 shows the final folded or collapsed state of the assembly obtained by folding the two sections of the figure 8 pattern shown in FIG. 5 together. Only one frame member is shown for simplicity.

DESCRIPTION OF THE PREFERRED EMBODIMENTS

Figure 1:
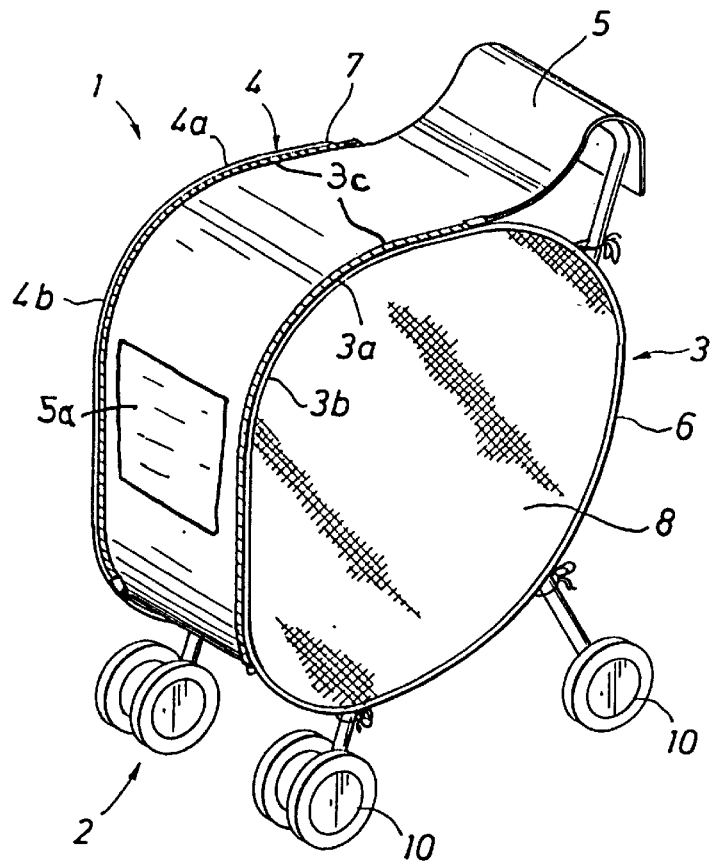
FIG. 1 is a perspective view of a typical stroller fitted with a first embodiment of the wind screen assembly.
Figure 2:
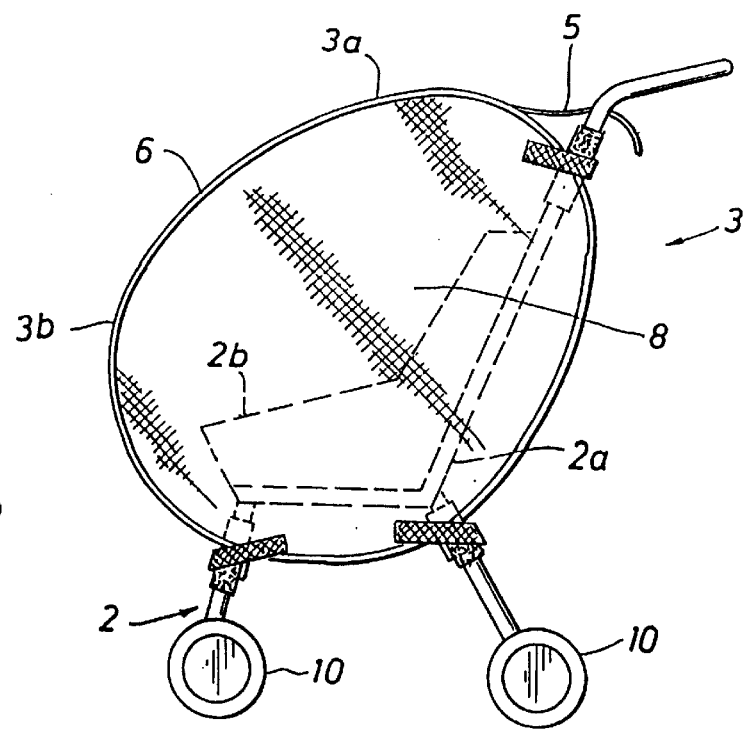
FIG. 2 is a side elevation of the stroller of FIG. 1 illustrating a modified embodiment of the wind screen assembly.

Referring to FIG. 1, the collapsible wind screen assembly 1 is shown secured to a stroller vehicle 2. The stroller vehicle, shown in FIG. 2, comprises right and left frames 2a supported on wheels 10, a child's seat 2b, and a means supporting seat 2b between the right and left frames. The supporting means may be a set of metal struts running between frames 2a. The wind screen assembly 1 includes a left side panel member 3 secured to the left side of the stroller a right side panel member 4 secured to the right side of the stroller and a cover member 5 which covers the top and front of the stroller. Left and right side panel members may be secured to the stroller by adhesive tape, laces, or the like. For example, pairs of strings or laces 2c may be tied around specified points on the frame of the baby stroller. Alternatively, as illustrated in FIG. 2, pairs of strips of fabric 2d having hook and loop connector elements such as Velcro elements secured thereto may be wrapped around a point on the frame of the stroller and secured together. Velcro-type elements and similar attachment elements employ resilient hook-shaped elements that engage and hold loop elements to secure the two connector elements together. The elements are separated by pulling the resilient hooks out of the loops. As used herein, the term "Velcro-type" is used to identify this type hook-loop securing means. Left and right side panel members comprise loop members 6 and 7, respectively, and are made of resilient material. The resilient material may be selected from a variety of metal or plastic materials, including steel, aluminum, titanium alloys, flexible plastics, fiberglass and shape memory alloys, such as Flexon®. The loop members 6 and 7 are preferably sheathed in a flexible sheet or web, such as, cloth or a plastic sheet. Alternatively, the loop members may be dip-coated with a molten thermoplastic material which cools to form an adherent coating.

Each panel member includes a sheet or web of flexible material secured to and extending across each loop member as shown, for example, at 8 on left panel member 3 in FIG. 1. The edges of cover member 5 are attached to the top edges of the panel members 3 and 4, generally shown at 3a and 4a, and to the front edges of panel members 3 and 4, generally shown at 3b and 4b, either permanently by stitches, adhesive, or the like, or removable by mating zippers 3c (FIG. 1) or Velcro members 3d (FIG. 3), or the like, allowing the cover member to be separated from the side panel members. Cover member 5 is not a load-bearing element, and does not aid in securing the panel members to the stroller; it merely covers the interior of the stroller.

Cover member 5 and the sheets extending across panel members 3 and 4 may be made from a flexible thermoplastic sheet, such as a transparent polyolefin or an air-permeable knitted or woven fabric, such as a nylon fabric or mosquito netting material. Combinations of such materials may be used. For example, the cover member 5 could be made from a closely woven nylon to block sunlight and provide the baby with shade. A clear thermoplastic sheet may be used to cover a hole or cutout portion in the nylon fabric, providing the baby with a window 5a. Preferably, the cover member 5 and the sheets on panel members 3 and 4 are made at least partially of air-permeable knitted or woven fabric to allow improved ventilation. Mosquito-netting material allows particularly excellent ventilation. Most prior art windscreens use polyvinyl chloride films or other plastic films as windshields. This leads to poor ventilation in the enclosed stroller, creating a greenhouse effect that can lead to unacceptably high temperatures in the stroller. The cover member 5 is attached to the side panels so that a free end 5b of the cover remains and may be draped over the handles of carriage 2, as shown in FIG. 1. This helps to prevent rain from entering the interior ot the carriage. Alternatively, laces or tapes 11 may be used to secure the free end of the cover to the handle 2 as illustrated in FIG. 3.

In FIG. 5, the embodiment which includes a permanently attached cover member is shown removed from the stroller with side panel members 3 and 4 placed together with cover member 5 placed in between members 3 and 4. After placing members 3 and 4 together the assembly is twisted into a figure eight pattern as shown if FIG. 5 by twisting one side of the loop member 180 degrees in the direction shown by arrow 9. A first loop section of the figure eight pattern is then folded over onto the second loop section of the figure eight pattern in the manner shown in FIG. 6. Only one frame member 6 is shown in FIG. 6 for simplicity.

In embodiments wherein the cover member may be removed from the side panel members, the cover member is detached from the side panel members and stored separately. In these embodiments, the side panel members are individually twisted and folded essentially the same way as shown in FIGS. 4–6. The individually folded side panels may be stored separately.

Although preferred embodiments of the invention have been illustrated, it will be understood that modification may be made within the spirit and scope of the appended claims.

What is claimed is:

1. A collapsible wind screen assembly to be used in combination with a baby stroller comprising a seat adapted to support a child, a left frame supported on wheels, a right frame supported on wheels, and a means of supporting the seat between the right and left frames, said wind screen assembly comprising:
   a left side panel member adapted to be detachably secured to the left frame of said stroller, said left side panel member comprising a first loop of resilient material which defines a peripheral edge of said left side panel member and a flexible web attached to the first loop of resilient material, wherein said first flexible web extends across an interior of the first loop of resilient material, said left side panel being twistable into a figure 8 pattern having two loop sections that are foldable together;
   a right side panel member adapted to be detachably secured to the right frame of said stroller, said right side panel member comprising a second loop of resilient material which defines a peripheral edge of said right side panel member, and a second flexible web attached to the second loop of resilient material, wherein said second flexible web extends across an interior of the second loop of resilient material, said right side panel being twistable into a figure 8 pattern having two loop sections that are foldable together; and
   a flexible cover member having a first edge which is adapted to be secured to the peripheral edge of said left side panel member and a second edge which is adapted to be secured to the peripheral edge of said right side panel member.

2. The wind screen assembly as defined in claim 1, wherein the flexible cover member is releasably secured to the peripheral edges of the left and right side panel members.

3. The wind screen assembly as defined in claim 1, wherein the flexible cover member is releasably secured to the peripheral edges of the left and right side panel members through the use of zippers.

4. The wind screen assembly as defined in claim 1, wherein the flexible cover member is releasably secured to the peripheral edges of the left and right side panel members through the use of mating hook and loop fastener strips.

5. The wind screen assembly as defined in claim 1, wherein the flexible cover member is permanently secured to the peripheral edges of the left and right side panel members.

6. A collapsible wind screen assembly according to claim 1 wherein the first and second loops of resilient material are made from a material selected from the group consisting of steel, aluminum, titanium alloys, fiberglass, and flexible plastics.

7. A collapsible wind screen assembly according to claim 1 wherein the first and second loops of resilient material are made from a material selected from the group consisting of spring steel and titanium-based shape memory alloys.

8. A collapsible wind screen assembly according to claim 1, wherein the flexible cover member, the first flexible web, and the second flexible web are made from an air-permeable material selected from the group consisting of knitted fabrics and woven fabrics.

9. A collapsible wind screen assembly according to claim 1, wherein the flexible cover member, the first flexible web, and the second flexible web are made from an air-permeable nylon mesh material.

10. A collapsible wind screen assembly according to claim 1, wherein the flexible cover member, the first flexible web, and the second flexible web are made from an air-permeable mosquito netting material.

11. A collapsible wind screen assembly according to claim 1, wherein the flexible cover member, the first flexible web, and the second flexible web are made from a clear plastic material.

12. A collapsible wind screen assembly according to claim 1, wherein said first and second loops of resilient material are enclosed in a layer of cloth material.

13. A collapsible wind screen assembly according to claim 1, wherein said first and second loops of resilient material are enclosed in a layer of plastic material.

14. A collapsible wind screen assembly according to claim 1, wherein the flexible cover member, the first flexible web, and the second flexible web are waterproof.

15. A method of folding a collapsible wind screen assembly attached to a baby stroller, said method comprising:
   detaching a left side panel of said wind screen assembly and a right side panel of said wind screen assembly from the stroller;

twisting the left side panel into a compact structure for storage by twisting a first loop of resilient material of said left side panel into a first figure 8 pattern having two loop sections and folding the two loop sections of said first figure 8 pattern together; and twisting a right side panel of said wind screen into a compact structure by twisting a second loop of resilient material of said right side panel into a second figure 8 pattern having two loop sections and folding the two loop sections of the second figure 8 pattern together.

16. The method of claim 15, wherein said wind screen assembly includes a cover member permanently secured to the right and left side panel members, said method further comprising:

placing the right side panel member adjacent to the left side panel member with the cover member therebetween; and simultaneously twisting the left and right side panel members into a compact structure for storage by twisting the first loop and second loop of resilient material into overlapping first and second figure 8 patterns, and folding the overlapping first and second figure 8 patterns into a compact structure for storage.

17. The method of claim 15, wherein said wind screen assembly includes a cover member detachably secured to the right and left side panel members, said method comprising:

detaching said cover member from said right and left panel members;

twisting the left side panel into a compact structure for storage by twisting the first loop of resilient material into a first figure 8 pattern having two loops and folding the two loop sections of the first figure 8 pattern together; and twisting the right side panel into a compact structure for storage by twisting the second loop of resilient material into a second figure 8 pattern having two loop sections and folding the two loop sections of the second figure 8 pattern together.

\* \* \* \* \*